United States Patent [11] 3,576,984

[72] Inventor Roland S. Gregg, Jr.
Canoga Park, Calif.
[21] Appl. No. 751,607
[22] Filed Aug. 9, 1968
[45] Patented May 4, 1971
[73] Assignee The Bunker-Ramo Corporation
Canoga Park, Calif.

[54] MULTI-FUNCTION LOGIC NETWORK
13 Claims, 2 Drawing Figs.

[52] U.S. Cl. .......... 235/176, 235/168, 307/207, 235/175
[51] Int. Cl. .......... G06f 7/385, G06f 7/38
[50] Field of Search .......... 235/175, 176, 173, 168; 307/207, 208, 215, 216

[56] References Cited

UNITED STATES PATENTS

| | | | |
|---|---|---|---|
| 3,094,614 | 6/1963 | Boyle | 235/175X |
| 3,125,676 | 3/1964 | Jeeves | 307/215X |
| 3,406,298 | 10/1968 | Axelrod | 307/215X |
| 3,407,357 | 10/1968 | Spandorfer et al. | 235/176X |
| 3,427,445 | 2/1969 | Dailey | 235/175 |
| 3,381,117 | 4/1968 | Forslund et al. | 235/175X |
| 3,446,990 | 5/1969 | Goldberg | 307/207X |
| 3,475,621 | 10/1969 | Weinberger | 307/215 |

*Primary Examiner*—Malcolm A. Morrison
*Assistant Examiner*—James F. Gottman
*Attorney*—Frederick M. Arbuckle

ABSTRACT: A multifunction logic network is provided to perform a selected one of a plurality of operations, each a function of one, two or three variables and five control signals. A first plurality of gates provide all possible AND functions of two variables A and D, each in response to a separate control signal. A fifth gate then provides all possible inverted functions of a third variable C when true and one or more of the other variables A and D in response to the output signals of the first four gates and a fifth control signal. All possible AND functions of two variables are then combined by a sixth gate with the output of the fifth gate. A seventh gate provides all possible inverted functions of the third variable C when false and the other variables A and D in response to the output of the fifth gate and the fifth control signal. An eighth gate effectively OR's the complements of the sixth and seventh gates to provide all of 30 possible functions of one or more of the variables A, D and C. The remaining two operations consist of selectively transmitting one of two possible binary constants.

INVENTOR.
ROLAND S. GREGG, JR.
BY Lindenberg + Freilich

MULTI-FUNCTION LOGIC NETWORK

BACKGROUND OF THE INVENTION

1. Field of the Invention

This invention relates to a multifunction network for use in an arithmetic unit of a digital computer to perform many logical operations in addition to arithmetic operations.

2. Description of the Prior Art

In a digital computer, it is customary to provide logic networks between corresponding bits of a data register (D register) and an accumulator register (A register) to perform arithmetic operations. In the usual case, the logic networks perform only the arithmetic operation of addition. Subtraction is then accomplished by adding the two's complement of the subtrahend. In other cases, a true subtractor distinct from the adder is provided. Multiplication and division are usually carried out automatically by controlled routines of additive and subtractive operations.

Since the logic network for addition includes some basic functions of two variables of A and D stored in their respective A and D register, it is recognized that an adder can be controlled to perform some useful operations, such as merge (OR function) and extract (AND function) by selectively inhibiting some gates. However, many more possible functions of three variables taken in groups of one, two or three have not been performed in the past although such functions may have great utility in particular applications. Instead, it has been suggested that so-called universal logic networks be prefabricated for use in a particular manner determined at the time of assembly. In that manner, one network is provided for each type of use.

It has also been suggested in U.S. Pat. No. 3,201,574 that a logic network be made flexible by providing control signals in much the same manner as control signals have been provided to a more limited extent in adders of arithmetic units. However, the particular logic network suggested is useful as an adder only by connecting control terminals to a carry input terminal. Thus, the network suggested is an adder of such a particular configuration that it may be used for other operations if the carry input terminal of each of four gates is connected to a separate control terminal. However, the network is then not useful for performing arithmetic operations. To perform both arithmetic and logical operations, two separate networks must be provided, one wired as an adder and one not so wired but controlled as a flexible logic network. If subtraction is also desired, as it would be except in very special applications, a third network wired in a different configuration would be required. It would be desirable to provide a single logic network to perform various logical operations as well as arithmetic operations, including subtraction.

OBJECTS AND SUMMARY OF THE INVENTION

The primary object of this invention is to provide a logic network for performing various logic operations in response to control signals.

The embodiment of the invention specifically disclosed herein comprises a logic network for providing at an output terminal a signal representing a selected one of a plurality of functions of one, two and three variables represented by input signals present at data terminals in response to five control signals applied to other terminals. A first means produces the ORed function of selected different ones of all possible AND functions of two variables A and D in response to four control signals $M_1$ to $M_4$. A second means responsive to the first means and to the fifth control signal $M_5$ selectively translates to the network output terminal either a signal representing the ORed function produced by the first means or a signal representing the ORed function of the third variable ANDed with the ORed function produced by the first means and the ORed function of the complement of the third variable ANDed with all of the functions of the two variables not selected by the four control signals $M_1$ to $M_4$ in the first means. The first means includes a first inverting logic gate connected to receive signals at input terminals thereof representing the functions $\overline{DA}$, $\overline{D}A$, $DA$ and $D\overline{A}$ selected for O-ring by different ones of the control signals $M_1$ to $M_4$ and a second inverting logic gate coupling the output of the first gate to the network output terminal.

The second means includes a third inverting logic gate adapted to receive at input terminals thereof signals representing: the functions $\overline{DA}$, $\overline{D}A$, $DA$ and $D\overline{A}$ selected for O-ring by different ones of the control signals $M_1$ to $M_4$; the third variable $\overline{C}$; and the fifth control signal $M_5$, and adapted to provide at an output terminal thereof that is connected to an input terminal of the first inverting gate the function $(\overline{DAM_1}+\overline{D}A\overline{M_2}+DA\overline{M_3}+D\overline{AM_4})C\overline{M_5}$. The second means further includes a fourth inverting logic gate having: its output terminal connected to a second input terminal of the second gate; one input terminal connected to the output terminal of the third gate; one input terminal connected to receive the fifth control signal $M_5$; and one input terminal connected to receive the third variable $\overline{C}$, whereby a signal is produced at the network output terminal in accordance with the following Boolean logic equation:

$$S=(\overline{DAM_1}+\overline{D}A\overline{M_2}+DA\overline{M_3}+D\overline{AM_4})M_5+$$
$$(\overline{DA}M_1+\overline{D}AM_2+DAM_3+D\overline{A}M_4)\,\overline{CM_5}+$$
$$(\overline{DAM_1}+\overline{D}A\overline{M_2}+DA\overline{M_3}+D\overline{AM_4})\,C\overline{M_5}$$

The novel features that are considered characteristic of this invention are set forth with particularity in the appended claims. The invention will best be understood from the following description with reference to the accompanying drawings.

DESCRIPTION OF THE PREFERRED EMBODIMENTS

Figures 1, 2:
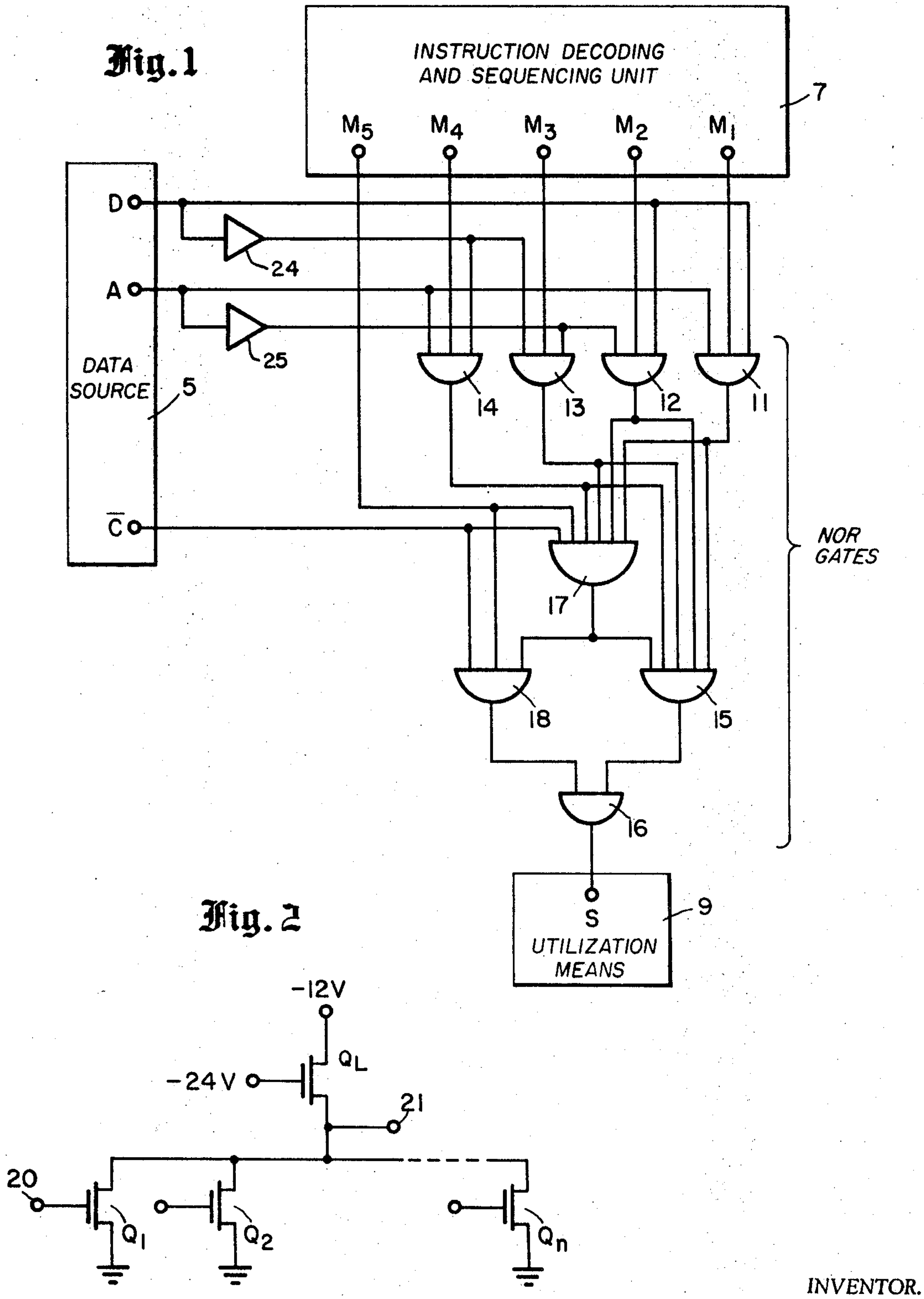
FIG. 1 is a logic diagram of a preferred embodiment of the invention.
FIG. 2 is a circuit diagram of preferred inverting gates for implementing the logic diagram of FIG. 1.

Referring now to FIG. 1, a network of eight inverting gates is shown in a configuration for providing any one of 32 functions with three input terminals A, D, and $\overline{C}$ connected to a data source 5 and five control terminals $M_1$ to $M_5$ connected to an instruction decoding and sequencing unit 7. Energizing signals at the terminals will be referred to hereinafter by the same reference characters as the terminal to which applied, as is the practice of those skilled in the art of logical design. The following table sets forth all of the operations made possible by controlling signals $M_1$ to $M_5$.

| Op. No. | M-control signals 5 | 4 | 3 | 2 | 1 | Output Function (S) | Remarks |
|---|---|---|---|---|---|---|---|
| 1 | 0 | 0 | 0 | 0 | 0 | $\overline{C}$ | Trans. $\overline{C}$. |
| 2 | 0 | 0 | 0 | 0 | 1 | $(\overline{D}A+D\overline{A}+DA)\overline{C}+\overline{D}\,\overline{A}C=(D+A)\overline{C}+\overline{D}\,\overline{A}C$ | |
| 3 | 0 | 0 | 0 | 1 | 0 | $(\overline{D}\,\overline{A}+DA+D\overline{A})\overline{C}+\overline{D}AC=(D+\overline{A})\overline{C}+\overline{D}AC$ | |
| 4 | 0 | 0 | 0 | 1 | 1 | $(DA+D\overline{A})\overline{C}+\overline{D}\,\overline{A}+\overline{D}A)C=D\overline{C}+\overline{D}C$ | EXC.OR:D, C. |
| 5 | 0 | 0 | 1 | 0 | 0 | $(\overline{D}\,\overline{A}+\overline{D}A+D\overline{A})\overline{C}+DAC=(\overline{D}+\overline{A})\overline{C}+DAC$ | |
| 6 | 0 | 0 | 1 | 0 | 1 | $(\overline{D}A+D\overline{A})\overline{C}+(DA+\overline{D}\,\overline{A})C$ | ADD. |
| 7 | 0 | 0 | 1 | 1 | 0 | $(\overline{D}\,\overline{A}+D\overline{A})\overline{C}+(\overline{D}A+D\overline{A})C=A\overline{C}+(\overline{D}A+DA)C$ | |
| 8 | 0 | 0 | 1 | 1 | 1 | $D\overline{A}\,\overline{C}+(\overline{D}A+DA+\overline{D}\,\overline{A})C=D\overline{A}\,\overline{C}+(\overline{D}+A)C$ | |
| 9 | 0 | 1 | 0 | 0 | 0 | $(D\overline{A}+\overline{D}A+DA)\overline{C}+D\overline{A}C=(\overline{D}+A)\overline{C}+D\overline{A}C$ | |
| 10 | 0 | 1 | 0 | 0 | 1 | $(\overline{D}A+DA)\overline{C}+(\overline{D}\,\overline{A}+D\overline{A})C=A\overline{C}+\overline{A}C$ | EXC.OR:A, C. |

| Op. No. | M-control signals 5 | 4 | 3 | 2 | 1 | Output Function (S) | Remarks |
|---|---|---|---|---|---|---|---|
| 11 | 0 | 1 | 0 | 1 | 0 | $(\overline{D}\overline{A}+DA)\overline{C}+(\overline{D}A+D\overline{A})C$ | SUBTRACT. |
| 12 | 0 | 1 | 0 | 1 | 1 | $DA\overline{C}+(\overline{D}\overline{A}+\overline{D}A+D\overline{A})C=DA\overline{C}+(\overline{D}+\overline{A})C$ | |
| 13 | 0 | 1 | 1 | 0 | 0 | $(\overline{D}\overline{A}+\overline{D}A)\overline{C}+(DA+D\overline{A})C=\overline{D}\overline{C}+DC$ | MATCH. |
| 14 | 0 | 1 | 1 | 0 | 1 | $\overline{D}A\overline{C}+(\overline{D}\overline{A}+DA+D\overline{A})C=\overline{D}A\overline{C}+(D+\overline{A})C$ | |
| 15 | 0 | 1 | 1 | 1 | 0 | $\overline{D}\overline{A}\overline{C}+(\overline{D}A+DA+D\overline{A})C=\overline{D}\overline{A}\overline{C}+(D+A)C$ | |
| 16 | 0 | 1 | 1 | 1 | 1 | C | TRANS. C. |
| 17 | 1 | 0 | 0 | 0 | 0 | 1 | |
| 18 | 1 | 0 | 0 | 0 | 1 | $\overline{D}A+DA+D\overline{A}=D+A$ | OR: D,A. |
| 19 | 1 | 0 | 0 | 1 | 0 | $\overline{D}\overline{A}+DA+D\overline{A}=D+\overline{A}$ | |
| 20 | 1 | 0 | 0 | 1 | 1 | $DA+D\overline{A}=D$ | TRANS. D. |
| 21 | 1 | 0 | 1 | 0 | 0 | $\overline{D}\overline{A}+\overline{D}A+D\overline{A}=\overline{D}+\overline{A}=\overline{DA}$ | NAND: D,A. |
| 22 | 1 | 0 | 1 | 0 | 1 | $\overline{D}A+D\overline{A}$ | EXC.OR:D, A. |
| 23 | 1 | 0 | 1 | 1 | 0 | $\overline{D}\overline{A}+D\overline{A}=\overline{A}$ | COMP. A. |
| 24 | 1 | 0 | 1 | 1 | 1 | $D\overline{A}$ | |
| 25 | 1 | 1 | 0 | 0 | 0 | $\overline{D}\overline{A}+\overline{D}A+DA=\overline{D}+A$ | |
| 26 | 1 | 1 | 0 | 0 | 1 | $\overline{D}A+DA=A$ | TRANS. A. |
| 27 | 1 | 1 | 0 | 1 | 0 | $\overline{D}\overline{A}+DA$ | COMPARE. |
| 28 | 1 | 1 | 0 | 1 | 1 | DA | AND: D, A. |
| 29 | 1 | 1 | 1 | 0 | 0 | $\overline{D}\overline{A}+\overline{D}A=\overline{D}$ | COMP. D. |
| 30 | 1 | 1 | 1 | 0 | 1 | $\overline{D}A$ | |
| 31 | 1 | 1 | 1 | 1 | 0 | $\overline{D}\overline{A}=\overline{D+A}$ | NOR: D, A. |
| 32 | 1 | 1 | 1 | 1 | 1 | 0 | |

From the table of operations it may be seen that any one of 16 possible functions not involving the third variable $\overline{C}$ is provided at an output terminal S connected to a utilization means 9 by energizing the control terminal $M_5$ and selectively energizing the remaining control terminals $M_1$ to $M_4$ with a binary 1 signal. Another 16 possible functions which do involve the third variable $\overline{C}$ are provided when terminal $M_5$ is deenergized with the remaining control terminals are selectively energized. Of the total, 12 are functions of three input variables A, D and C, 12 are functions of two input variables, and six are functions of just one variable. The remaining two operations consist of selectively transmitting one of two possible binary constants (binary 1 and binary 0). Some of the more commonly used logic functions are described as to the nature of the operation in a separate column of the foregoing table. The most useful are, of course, the sixth for addition and the 11th for subtraction by adding the two's complement. The function actually provides only the addition of the one's complement of the variable D but the addition of the two's complement for a subtractive operation is readily provided by forcing the variable $\overline{C}$ of the logic network in the least significant bit position to be false. The variable $\overline{C}$ for each of the remaining or significant bit positions is derived by a logic network not shown in a manner well known to those skilled in the art. In the simplest form, the carry network for each half-adder network shown in FIG. 1 may be implemented in accordance with the following logic equation:

$$C_i=A_iD_i+A_iC_{i-1}+D_iC_{i-1}$$

where the subscript $i$ denotes a given bit position and the subscript $i-1$ denotes a carry from the next less significant bit position. A system for generating carries in accordance with that logic equation is commonly referred to as a ripple carry network since the carry for the given stage cannot be computed until all carries for bit positions of lower significance have been generated in sequence. For large numbers of 30 to 40 binary digits, the time required to generate the more significant carries is too long for high-speed parallel-structured computers. To minimize the time required to generate the more significant carries, it is possible to generate the carry for a given bit position directly from all of the variables A and D of lower significance, but that would obviously require a larger network for each successive carry of greater significance. A compromise between the ripple and parallel carry generation of carries is a system often referred to as "look ahead" wherein carries of groups of successive bit positions are generated in parallel while carries are propagated in series between groups. Other techniques may be employed to minimize the carry propagation time without inordinately increasing the number of logic elements required. For purposes of this invention, any of the known techniques of generating a carry for a given bit position may be employed. In addition, provision may be made for substituting for the carry a third variable which, for convenience, may be referred to by the same reference character $\overline{C}$. Accordingly, except for the arithmetic operations of addition and subtraction, the variable C in the foregoing table is to be considered an independent variable.

In operation, the control signals $M_1$ to $M_5$ are generated by a control unit (not shown) of the digital computer which decodes an instruction and provides static signals on terminals $M_1$ through $M_5$ for the period of time required to complete the operation. When the control terminal $M_5$ is energized by a binary 1 signal, only inverting gates 11 through 16 area active owing to the circuit configuration of the inverting gates 11 to 18.

A preferred circuit configuration for each of the inverting gates is shown in FIG. 2 as comprising a plurality of insulated-gate, field-effect transistors $Q_1$, $Q_2$, ... $Q_n$, each having its source connected to ground and its drain connected to a source of potential (−12 volts) by a load transistor $Q_L$ of the same type. The gate of the load transistor $Q_L$ is biased negatively (at −24 volts) such that it remains turned on at all times. However, current will not flow through the load transistor $Q_L$ unless one or more of the transistors $Q_1$, $Q_2$ ... $Q_n$ is turned on by a negative gate voltage.

In this preferred embodiment of the invention, negative logic is employed. Accordingly, a binary 0 is defined as 0 volts, and a binary 1 is defined as −12 volts. Consequently, if a true signal is applied to the gate 20 of the transistor $Q_1$, the output terminal 21 is clamped at substantially ground potential by the conducting transistor $Q_1$ thereby providing as an output a 0-volt signal (binary 0). In order for the output terminal 21 to be true (−12 volts), the signal present at the gate for each one of the transistors $Q_1$, $Q_2$... $Q_n$ must be false. However, it should be understood that the levels of 0 and −12 volts have been arbitrarily defined as binary 0 and binary 1. Positive logic could just as well be employed by defining the levels of 0 and −12 volts as binary 1 and binary 0. Complementary changes in the input signals to the logic network of FIG. 1 would then be required.

With inverting gates 17 and 18 held inactive by a true signal at terminal $M_5$, only functions involving the variables A and D are generated under the control of the remaining terminals $M_1$ to $M_4$. If all of those control terminals are false, the output terminal S is true regardless of the values of the variables A and D, since gates 11 to 14 provide all of the possible AND functions of the two variables A and D such that all three input terminals of one of the four gates will be false at the same time. For instance, assuming A and D both to be true, then all three input terminals to gate 13 are false owing to inverters 24 and 25 connecting the terminals A and D thereto. Therefore the output terminal of gate 13 will be true and since gates 15 and 16 are both inverting gates, the output terminal S will also be true. Consequently, with terminals $M_1$ to $M_4$ false and terminal $M_5$ true, the operation performed is the transmission of a binary 1.

Although inverters 24 and 25 are shown for providing complements of input signals A and D to various ones of the gates 12 to 14, it should be noted that rather than employ two additional active elements for that purpose, the complements may be derived directly from flip-flops of the respective A and D registers. However, since insulated-gate (MOS) field-effect transistors are preferred in the implementation of the present invention, and the same may be readily fabricated on a single chip to provide an integrated circuit together with many other logic elements of the same configuration, it is desirable to minimize the number of external connections to be made to the chip. Accordingly, it is preferred to have only terminals A and D to derive the complementary signals $\bar{A}$ and $\bar{D}$ through respective inverters 24 and 25.

Now assuming input terminals $M_1$ and $M_5$ are true while the remaining terminals $M_2$, $M_3$ and $M_4$ are false, the inverting gate 11 is inactivated since, as noted hereinbefore, with reference to FIG. 2, a binary 1 at any input terminal to the gate will drive the output terminal to ground potential (binary 0). Since gates 17 and 18 remain inactive, the output signal S will be the ORed function of the output from the remaining active gates 12, 13 and 14 as follows:

$$S=\bar{D}A+DA+D\bar{A}=D+A.$$

Similarly, if control terminals $M_2$ and $M_5$ are true while the remaining control terminals are false, gates 12, 17 and 18 are inactive to provide at the output terminal S the following function:

$$S=D\bar{A}+DA+\bar{D}\bar{A}=D+\bar{A}.$$

If control terminal $M_1$ is also energized along with control terminals $M_2$ and $M_5$, the operation performed is to simply transfer the input D to the output terminal S.

If only the control terminal $M_3$ is energized along with the control terminal $M_5$, the operation performed is in accordance with the following equation:

$$S=D\bar{A}+\bar{D}A+\bar{D}\bar{A}=\bar{D}+\bar{A}.$$

This operation may be referred to as the NAND function as distinct from the AND operation 28, the NOR operation 31 and the OR operation 18.

If control terminal $M_1$ is energized along with control terminals $M_3$ and $M_5$, only gates 12 and 14 remain active to provide at the output terminal S what is commonly referred to as the exclusive OR function. The remaining operations 21 through 30 are similarly derived by ORing output signals from certain gates 11 to 14 while others are selectively inactivated. If all of the control terminals $M_1$ to $M_5$ are energized, all of the gates 11 to 14 are inactivated along with gates 17 and 18 such that all of the input terminals to the gate 15 are false. In that manner, the output terminal S is false for the operation of transmitting a binary 0as indicated in the table as the last operation.

From the foregoing it may be seen that while control terminal $M_5$ is energized and gates 17 and 18 are thereby held inactive, the remaining gates 11 to 14 effectively function as a group of gates for selectively transmitting the four possible combinations of two binary input quantities D and A and the gates 15 and 16 together function as an OR gate to OR the output signals selectively transmitted by gates 11 to 14. If control terminal $M_5$ is not energized, the gate 18 will cooperate with gates 15, 16 and 17 to AND the third variable C with selected ones of the four possible combinations of two binary input variables D and A. If all are selected, the gates 18 and 16 transmit the third variable $\bar{C}$, and if none is selected, the complement C. Considering first the operation for which all are selected (i.e., for which none of the control terminals are energized), it may be readily appreciated that since all of the gates 11 to 14 are active, a binary 1 is transmitted to one input terminal of the gate 17. That effectively inhibits gates 15 and 17, leaving active only gates 18 and 16. The signal at two terminals of gate 18 are false; the third terminal is connected to the third variable $\bar{C}$. Accordingly, the output S will be a function of only the variable $\bar{C}$. If it is true, the output terminal S will also be true; but if it is false, the output terminal of the gate 18 will be true thereby driving the output terminal S false. This is so, as just noted, because the output terminal of the gate 17 is false while the control terminal $M_5$ is also false such that the output terminal of the gate 18 will then depend solely upon the value of the third variable $\bar{C}$. In this manner, while all control terminals are not energized, the operation performed by the network is to transmit the quantity of the third variable as it appears at the terminal $\bar{C}$. For arithmetic operations, the terminal $\bar{C}$ is connected to receive the complement of a carry generated by a logic network (not shown). However, as noted hereinbefore, that terminal may be connected to any other signal source, as by a decoding selector tree which selectively connects it to any one of a plurality of data sources.

If all of the control terminals $M_1$ to $M_4$ are energized while the control terminal $M_5$ remains deenergized, all of the gates 11 to 14 are deactivated, thereby transmitting a binary 0 to all input terminals of the gates 15 and 17. Since the control terminal $M_5$ is also false, the output terminal of the gate 17 will be true or false depending solely upon whether the third variable $\bar{C}$ is true or false. If it is false, all of the input terminals to the gate 17 will be false and its output terminal will be true. That terminal is connected to an input terminal of gates 15 and 18, both of which have all other terminals false. Accordingly, the true output signal from the gate 17 is transmitted to the output terminal S via the gates 15 and 18 in parallel and the gate 16. If the third variable $\bar{C}$ is true, gate 17 is inactivated, and the output terminal S will be true.

If only the control terminal $M_1$ is energized, only the gate 11 is directly inactivated by a control signal. Accordingly, the three possible AND functions of two binary input variables D and A transmitted by the remaining active gates 12, 13 and 14 are effectively ORed at the input terminals of gates 15 and 17 as described hereinbefore with reference to the OR function (operation 17) of the foregoing table. However, the signal at the output terminal S will now also depend upon the value of the third variable $\bar{C}$ since gates 17 and 18 are active. Thus, except for the one combination of both D and A being false, one of the gates 12 to 14 will have all input terminals false and therefore transmit a true signal. But the ORed function provided by the gates 15 and 16 for the output signals of gates 12, 13 and 14 occurs only if the third variable $\bar{C}$ is false for if it is true, the output terminal will be false even if the variables D and A are false. If they are false, and the third variable is true, the output terminal S will still be true. Accordingly, energizing only the control terminal $M_1$ provides the following function:

$$S=(D\bar{A}+DA+\bar{D}A)\,\bar{C}+\bar{D}\bar{A}C=(D+A)\bar{C}+\bar{D}\bar{A}C$$

Thus, gate 17 AND's the third variable $\bar{C}$ with the ORed function of output signals from those gates 11, 12, 13 and 14 not inactivated by an energizing signal on a corresponding control terminal while gate 18 effectively OR's the logical AND function of the third variable with the output function of whichever one of the gates 11, 12, 13 and 14 is inactivated.

If more than one of the gates 11 to 14 is inactivated, gate 17 effectively provides the AND function of the third variable $\bar{C}$ and the OR function of the output signals from the gates remaining active while the gate 18 effectively OR's the AND function of the third variable $\bar{C}$ with the output functions of the inactive gates. For instance, if both control terminals $M_1$ and $M_2$ are energized, gates 11 and 12 are inactive so that gate 17 provides the function $(D\bar{A}+DA)\bar{C}$ while the gate 18 OR's with that function the AND function $\bar{D}A\cdot\overline{DA}\cdot C$ which is equivalent to $\bar{D}C$. Accordingly, with both control terminals $M_1$ and $M_2$ energized and the remaining control terminals are not energized, the output function at the terminal S is as follows:

$$S=(D\bar{A}+DA)\bar{C}+\bar{D}C=D\bar{C}+DC$$

That function is the EXCLUSIVE OR of the input variables D and C.

To further illustrate the operation of the present invention with one of its most complex functions, consider next the addition carried out with control terminals $M_1$ and $M_3$ energized in operation 6 of the foregoing table. Gate 17 effectively provides the AND function of the third variable $\overline{C}$ and the ORed functions of the active gates 12 and 14, which is the logical AND of the complement of the carry C and the exclusive OR function of the variables D and A. Gate 18 then effectively provides the logical AND function of the carry C and the function of the output signals of the inactivated gates 11 and 13. Upon ORing the effective functions of the gates 17 and 18 to the output terminal S by their cascade connection thereto of gates 17 and 18, the sum is provided as follows:

$$S=(D\overline{A}+\overline{D}A)\overline{C}+(DA+\overline{D}\overline{A})C$$

For subtraction, the complement of the variable A is added to the variable D by selectively energizing control terminals $M_2$ and $M_4$ to provide as the sum the following function:

$$S=(\overline{D}A+DA)\overline{C}+(\overline{D}A+D\overline{A})C$$

In summary, the gates 11 to 14 provide the four possible combinations of two variables D and A. The desired combinations are selected for the output function by inactivating the gates associated with the undesired functions. Gate 17 then effectively OR's functions of the remaining active gates 11 to 14 and forms the AND function of the ORed functions with the third variable $\overline{C}$ unless the control terminal $M_5$ is energized in which case gates 15 and 16 OR the output functions of the gates 11, 12, 13 and 14 not inactivated to the output terminal S. While the control terminal $M_5$ is not energized, the gate 18 effectively OR's with the logical AND function provided by the gate 17, the AND function of the third variable and the ORed functions of the inactivated gates 11 to 14.

As noted hereinbefore, as many networks of the present invention are provided in the arithmetic unit of a digital computer as there are binary digits in a number or word to be processed. For a 30-bit word or number, 30 networks are provided in a parallel structured computer, preferably as integrated circuits on a single chip with as many circuits to the chip as possible. Utilizing MOS transistors, as many as 10 networks can be provided on a chip with the present technology so that only three chips are required to provide all of the half-adders necessary for arithmetic operations and, in accordance with the present invention, a larger number of other logical operations than have heretofore been possible in an arithmetic unit. The network required to generate the carries for a 30-bit word can be placed on two integrated circuits again using MOS technology. If other variables are to be substituted as the third variable, a decoding selector tree for that purpose may be provided on one or more other chips. By incorporating such a large number of logical functions into the half-adder networks, considerable logic elements can be saved in any computer which requires parallel data handling. Thus, the present invention provides the ability to generate useful logical functions through the arithmetic unit with only five control signals.

Although particular embodiments of the invention have been described and illustrated herein, it is recognized that modifications and variations may readily occur to those skilled in the art and consequently it is intended that the claims be interpreted to cover such modifications and equivalents.

The embodiments of the invention in which an exclusive property or privilege is claimed are defined as follows:

I claim:

1. A multifunction logic network for providing at an output terminal a signal representing a selected one of a plurality of functions of one, two and three variables represented by input signals present at data terminals in response to five control signals $M_1$ to $M_5$ applied to other terminals thereof comprising:

first means for producing the ORed function of selected different ones of all possible AND functions of two of said variables A and D in response to said input signals representing said two variables, each AND function being selected by one of four of said control signals $M_1$ to $M_4$; and second means responsive to said first means and to control signal $M_5$ for selectively translating to said first means and to control output terminal either a first output signal representing said ORed function of selected AND functions of two of said variables, or a second output signal representing said third variable ANDed with said ORed function of selected AND functions of two of said variables, or a third output signal representing the complement of said third variable ANDed with all of said AND functions of two of said variables not selected.

2. A logic network as defined in claim 1 wherein said third variable is the complement of a binary arithmetic carry for producing at said output terminal a signal representing the sum of said two variables and said carry when AND functions of said two variables are so selected that each variable is ANDed with the complement of the other, and said fifth control signal $M_5$ selectively translates to said output terminal a signal representing the ANDed function of said third variable and the ORed function of each variable ANDed with the complement of the other, or the complement of said third variable and the ORed function of the AND function of said two variables and the complement of the AND function of said two variables.

3. A logic network as defined in claim 1 wherein said second means functions in response to said fifth control signal in accordance with the following Boolean logic equation:

$$S=(\overline{D}\overline{A}M_1+\overline{D}AM_2+DAM_3+D\overline{AM}_4)\overline{C}+$$
$$(DAM_1+\overline{D}AM_2+DAM_3+D\overline{AM}_4)C$$

where D, A and $\overline{C}$ are said variables.

4. A 2network as defined in claim 1 wherein said first means includes a first NOR gate connected to receive signals at input terminals thereof representing the functions $\overline{D}\overline{A}$, $\overline{D}A$, DA, and $D\overline{A}$ selected for ORing by respective ones of said control signals $M_1$, $M_2$, $M_3$ and $M_4$, and inverting means coupling the output of said first gate to said network output terminal whereby a signal is produced at said output terminal representing the function:

$$\overline{DAM}_1+\overline{D}A\overline{M}_2+DA\overline{M}_3+D\overline{AM}_4$$

5. A logic network as defined in claim 4 wherein said second means comprises:

a second NOR gate adapted to receive at input terminals thereof signals representing the functions $\overline{D}\overline{A}$, $\overline{D}A$, DA and $D\overline{A}$, selected for ORing in said first means by respective ones of said control signals $M_1$, $M_2$, $M_3$ and $M_4$;

said third variable $\overline{C}$; and the fifth one of said control signals $M_5$ to thereby provide at an output terminal thereof a signal representing the following function:

$$(\overline{DAM}_1+\overline{D}A\overline{M}_2+DA\overline{M}_3+D\overline{AM}_4)C\overline{M}_5;$$

the output terminal of said second gate being connected to a fifth input terminal of said first gate.

6. A logic network as defined in claim 5 wherein said inverting means comprises an output NOR gate having a second input terminal, and said second means further comprises a third NOR gate having its output terminal connected to said second input terminal of said output inverting logic gate, one input terminal connected to said output terminal of said second gate, one input terminal connected to receive said fifth control signal $M_5$ and one input terminal connected to receive said third variable $\overline{C}$, whereby a signal is produced at said network output terminal in accordance with the following Boolean logic equation:

$$S=(\overline{DAM}_1\,\overline{D}A\overline{M}_2+DA\overline{M}_3+D\overline{AM}_4)M_5+$$
$$(\overline{DA}M_1+\overline{D}AM_2+DAM_3+D\overline{A}M_4)\overline{CM}_5+$$
$$(\overline{DAM}_1+\overline{D}A\overline{M}_2+DA\overline{M}_3+D\overline{AM}_4)C\overline{M}_5.$$

7. A multifunction logic network capable of providing 32 distinct operations in response to five signals from a control unit of which one operation is to selectively transmit a binary 0 signal, another is to selectively transmit a binary 1 signal, and 30 are to selectively transmit signals, each representing a function of one or more of three signals from a data source, each signal from the data source representing a variable, comprising:

utilization means adapted to receive signals in response to desired ones of said 32 distinct operations;

a first inverting gate having one output terminal connected to said utilization means and having two input terminals;

second and third multiinput inverting gates, each having its output terminal connected to a different one of said input terminals of said first inverting gate;

a fourth multiinput inverting gate having its output terminal connected to an input terminal of each of said second and third inverting gates;

means connecting an input terminal of each of said third and fourth gates to said data source for receiving one variable;

means connecting an input terminal of each of said third and fourth inverting gates to said control unit for receiving a predetermined one of said five control signals;

means connected to said data source for receiving signals representing second and third variables and connected to said control unit for receiving the remaining four of five control signals, and in response to said second and third signals representing variables, and said remaining four control signals, producing selected ones of all possible AND functions of said second and third variables, each AND function being selected by one of the remaining four of said control signals; and means for coupling each one of said AND functions produced by said last-named means to a different input terminal of each of said second and fourth inverting gates.

8. A multifunction logic network as defined in claim 7 wherein said means for producing the ORed function of selected ones of all possible AND functions of said second and third variables comprises four inverting logic gates and means for coupling input terminals of each of said four inverting gates to said data source for receiving at input terminals thereof all possible AND functions of said second and third signals, and complements thereof, and each of said four gates having one input terminal connected to a different one of said remaining four control signals.

9. A multifunction logic network as defined in claim 8 wherein each of said inverting gates consists of a direct-coupled transistor-logic gate consisting of field-effect transistors.

10. A multifunction logic network as defined in claim 9 wherein said field-effect transistors are insulated-gate field-effect transistors.

11. A logic network for providing a network output terminal a signal representing a selected one of a plurality of functions of one, two and three variables represented by input signals present at data terminals in response to five control signals $M_1$ to $M_5$ applied to other terminals comprising:

gating means for producing at four separate terminals selected different ones of all possible AND functions of two variables A and D in response to four control signals $M_1$ to $M_4$;

a first NOR gate having four input terminals connected to said four separate terminals of said gating means for producing at an output terminal thereof a complement of the ORed function of selected ones of all possible AND functions of two variables produced by said first means;

a second NOR gate having one input terminal connected to the output terminal of said first NOR gate and an output terminal connected to said network output terminal;

a third NOR gate having four input terminals connected to said four separate terminals of said gating means, a fifth input terminal connected to receive said third variable and a sixth input terminal connected to receive said third variable and a sixth input terminal connected to receive said fifth control signal $M_5$, and an output terminal connected to a fifth input terminal of said first NOR gate;

and a fourth NOR gate having an input terminal connected to said third-gate output terminal, an input terminal connected to receive said fifth control signal, an input terminal connected to receive said third variable signal, and an output terminal connected to an input terminal of said second NOR gate.

12. In combination:

a source of signals representing five control signals $M_1$ to $M_5$;

a source of signals representing two variables and complements thereof;

a source of signals representing a third variable;

a group of four NOR gates, each having three input terminals, one connected to receive a different one of four control signals $M_1$ to $M_4$ and two connected to receive pairs of signals, each pair representing a different one of four possible combinations of said two variables and complements thereof taken two at a time, except a combination of one of said two variables and its complement and a combination of the other of said two variables and its complement;

a fifth NOR gate having each of four input terminals connected to an output terminal of a different one of said four NOR gates, a fifth input terminal of a different one of said four NOR gates, a fifth input terminal connected to receive said fifth control signal $M_5$, and a sixth input terminal connected to receive signals representing said third variable;

a sixth NOR gate having each of four input terminals connected to an output terminal of a different one of said four NOR gates, and a fifth input terminal connected to the output terminal of said fifth NOR gate;

a seventh NOR gate having three input terminals, one connected to receive said fifth control signal, one connected to receive signals representing said third variable, and one connected to the output terminal of said fifth NOR gate; and an eighth NOR gate having two input terminals, each connected to a different one of the output terminals of said sixth and seventh NOR gates, and an output terminal.

13. A digital logic network useful in an arithmetic unit for providing an output signal selectively representing the sum of three variables as well as a plurality of other functions of said three variables, said network including:

a data source providing first, second, and third binary input signals respectively representing first, second and third variables of said three variables;

a set of four gates;

means for coupling said first and second input signals to said set of four gates to develop signals respectively representing different ones of the four possible AND functions of said first and second variables;

a signal source providing at least five binary control signals;

means applying each of four of said control signals to a different one of said four gates; and output gating means responsive to said fifth control signal, said third input signal, and said signals developed by said four gates for producing an output signal representing a particular function of said three variables determined by the states of said control signals.